(12) United States Patent
Liu et al.

(10) Patent No.: US 12,123,180 B2
(45) Date of Patent: Oct. 22, 2024

(54) FLEXIBLE BRACKET, FLEXIBLE WATER PIPE ASSEMBLY AND WATER FAUCET DEVICE

(71) Applicant: Beijing Kohler Ltd., Beijing (CN)

(72) Inventors: Chunyan Liu, Beijing (CN); Zhiqiang Zhang, Beijing (CN); Peng Zhang, Beijing (CN); Liguo Yan, Beijing (CN)

(73) Assignee: BEIJING KOHLER LTD., Beijing (CN)

( * ) Notice: Subject to any disclaimer, the term of this patent is extended or adjusted under 35 U.S.C. 154(b) by 142 days.

(21) Appl. No.: 17/994,647

(22) Filed: Nov. 28, 2022

(65) Prior Publication Data
US 2023/0183952 A1 Jun. 15, 2023

(30) Foreign Application Priority Data
Dec. 13, 2021 (CN) .......................... 202123126057.0

(51) Int. Cl.
*E03C 1/04* (2006.01)
*F16L 11/18* (2006.01)
(52) U.S. Cl.
CPC .......... *E03C 1/0403* (2013.01); *E03C 1/0404* (2013.01); *F16L 11/18* (2013.01)

(58) Field of Classification Search
None
See application file for complete search history.

(56) References Cited

U.S. PATENT DOCUMENTS

| | | | |
|---|---|---|---|
| 11,098,466 B1* | 8/2021 | Faison | E03C 1/05 |
| 2019/0264849 A1* | 8/2019 | Chung | F16L 27/023 |
| 2019/0368172 A1* | 12/2019 | Chung | F16L 27/0804 |
| 2020/0240125 A1* | 7/2020 | Harrison | E03C 1/0404 |

FOREIGN PATENT DOCUMENTS

CN 203533011 4/2014

* cited by examiner

*Primary Examiner* — Christine J Skubinna
(74) *Attorney, Agent, or Firm* — FOLEY & LARDNER LLP

(57) ABSTRACT

A flexible support includes a first mounting channel for mounting a flexible water pipe, a second mounting channel for mounting a flexible supporting and positioning mechanism, a first connecting end, a second connecting end, and a support body. The support body capable of being bent and deformed. The support body coupled between the first connecting end and the second connecting end. The second mounting channel is located on one side of the first mounting channel. The first mounting channel and the second mounting channel respectively penetrate through the first connecting end, the support body and the second connecting end in sequence.

20 Claims, 10 Drawing Sheets

FLEXIBLE BRACKET, FLEXIBLE WATER PIPE ASSEMBLY AND WATER FAUCET DEVICE

CROSS-REFERENCE TO RELATED PATENT APPLICATIONS

This application claims the benefit of and priority to Chinese Patent Application No. 202123126057.0, filed Dec. 13, 2021, the entire disclosure of which is incorporated by reference herein.

BACKGROUND

The application relates to the technical field of faucets, in particular to a flexible support, a flexible water pipe assembly and a faucet device.

In general, a monoblock metal shell is used as a support between a body of a current faucet and a faucet spout so as to mount an inside water pipe, which cannot realize angle adjustment. If the water outlet angle needs to be adjusted, the common way is to adjust a bubbler or push and pull a hose. The bubbler is fixedly arranged on a water outlet of the faucet spout, which has a limited adjusting range, and needs additional accessories. The way of pushing and pulling the hose needs to fix the hose pulled out, which is inconvenient to operate.

In view of this, it is necessary to provide a flexible support, a flexible water pipe assembly and a faucet device which can adjust the angle of the water outlet in a large range and are convenient to operate.

SUMMARY OF THE INVENTION

At least one embodiment relates to a flexible support. The flexible support includes a first mounting channel for mounting a flexible water pipe, a second mounting channel for mounting a flexible supporting and positioning mechanism, a first connecting end, a second connecting end, and a support body. The support body capable of being bent and deformed. The support body coupled between the first connecting end and the second connecting end. The second mounting channel is located on one side of the first mounting channel. The first mounting channel and the second mounting channel respectively penetrate through the first connecting end, the support body and the second connecting end in sequence.

Another embodiment relates to a flexible water pipe assembly. The flexible water pipe assembly includes a flexible water pipe, a flexible supporting and positioning mechanism, and a flexible support. The flexible support includes a first mounting channel for mounting the flexible water pipe, a second mounting channel for mounting the flexible supporting and positioning mechanism, a first connecting end, a second connecting end, and a support body. The support body capable of being bent and deformed. The support body coupled between the first connecting end and the second connecting end. The second mounting channel is located on one side of the first mounting channel. The first mounting channel and the second mounting channel respectively penetrate through the first connecting end, the support body and the second connecting end in sequence. The flexible supporting and positioning mechanism extends through the second mounting channel, and the flexible water pipe extends through the first mounting channel.

Another embodiment relates to a faucet device. The faucet device includes a faucet body being provided with a connector, a faucet spout, and a flexible support. The flexible support includes a first mounting channel for mounting a flexible water pipe, a second mounting channel for mounting a flexible supporting and positioning mechanism, a first connecting end connected with the connector of the faucet body, a second connecting end connected to the faucet spout, and a support body. One end of the flexible supporting and positioning mechanism being fixedly arranged in the connector, and another end of the flexible supporting and positioning mechanism being fixedly arranged in the faucet spout. The support body capable of being bent and deformed. The support body coupled between the first connecting end and the second connecting end. The second mounting channel is located on one side of the first mounting channel. The first mounting channel and the second mounting channel respectively penetrate through the first connecting end, the support body and the second connecting end in sequence. One end of the flexible water pipe passing through the connector and being connected with a body water channel in the faucet body, and the other end of the flexible water pipe being connected with a faucet spout water channel of the faucet spout.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
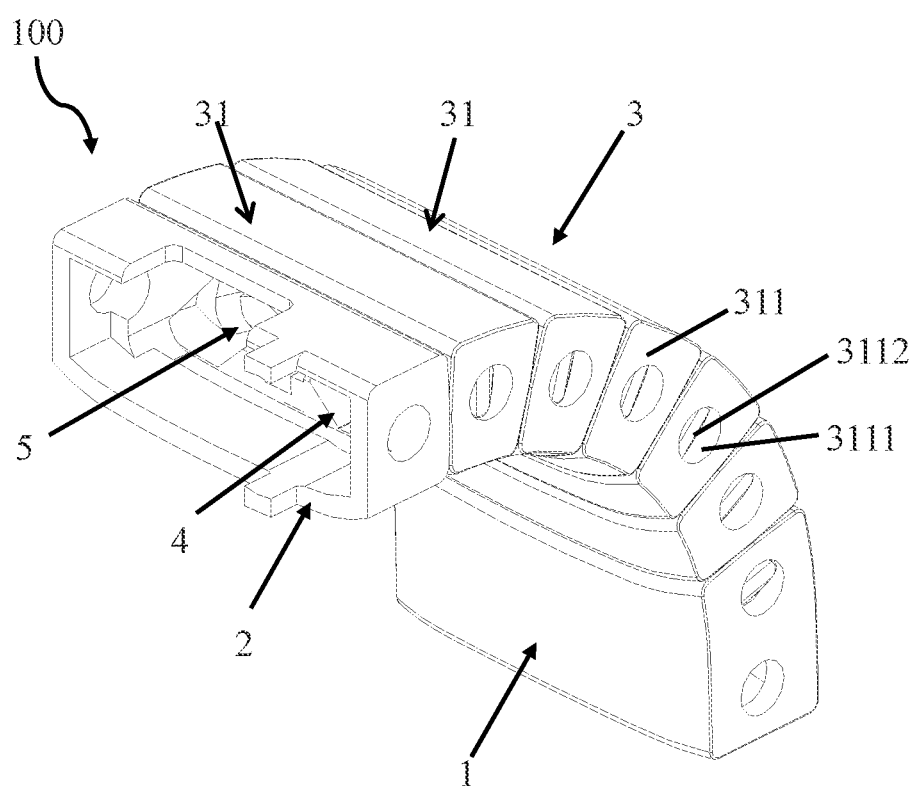
FIG. 1 is a stereoscopic diagram of a flexible support provided by a first embodiment of the application, according to an exemplary embodiment.

The specific embodiments of the application will be further described with reference to the drawings hereinafter. Same parts are denoted by same reference numerals. It should be noted that as used in the following description, the terms "front," "back," "left," "right," "upper" and "lower" refer to directions in the drawings, and the terms "inner" and "outer" refer to directions toward and away from, respectively, the geometric center of a particular component.

Disclosed are a flexible support, a flexible water pipe assembly and a faucet device. The flexible support is provided with a first mounting channel and a second mounting channel; the flexible support comprises a first connecting end, a second connecting end and a support body capable of being bent and deformed, and the support body is connected between the first connecting end and the second connecting end. According to the flexible support, the flexible water pipe assembly and the faucet device, the support body of the flexible support, a flexible supporting and positioning mechanism and the flexible water pipe are capable of being correspondingly bent and straightened, and under the action of the flexible supporting and positioning mechanism, the flexible support and the flexible water pipe are capable of being kept in a bent state or an upright state; a user is capable of adjusting a water outlet angle randomly according to different requirements, an angle adjusting range of the water outlet is enlarged, and operation is convenient.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The application aims to overcome the shortcomings of the prior art and provide a flexible support, a flexible water pipe assembly and a faucet device which can adjust the angle of the water outlet in a large range and are convenient to operate.

Technical solutions of the application provide a flexible support, where the flexible support is provided with a first mounting channel for mounting a flexible water pipe and a second mounting channel for mounting a flexible supporting and positioning mechanism; the flexible support comprises a first connecting end, a second connecting end and a support body capable of being bent and deformed, and the support body is connected between the first connecting end and the second connecting end; and the second mounting channel is located on one side of the first mounting channel, and the first mounting channel and the second mounting channel respectively penetrate through the first connecting end, the support body and the second connecting end in sequence.

In some embodiments, the support body comprises a plurality of hollow shells arranged in sequence, and any two adjacent hollow shells are pivotally connected; and two hollow shells at two ends of the plurality of hollow shells arranged in sequence are pivotally connected with the first connecting end and the second connecting end respectively.

In some embodiments, a shell side plate of the hollow shell is provided with an assembling hole and a pivotal shaft; and in the two adjacent hollow shells, the pivotal shaft of one hollow shell is assembled in the assembling hole of the other hollow shell, and the pivotal shaft is in clearance fit with the assembling hole.

In some embodiments, the support body comprises a flexible bottom plate, a flexible top plate, and flexible side plates connected to both sides of the flexible top plate; the flexible bottom plate is connected between the first connecting end and the second connecting end; one end of the flexible top plate is connected with the second connecting end, and the other end of the flexible top plate extends towards the first connecting end; and the flexible side plates extend from the flexible top plate to the flexible bottom plate; where, the flexible side plate is provided with a plurality of side plate notches at intervals, and openings of the side plate notches face the flexible bottom plate.

In some embodiments, a width of the side plate notch decreases gradually in a direction from the flexible bottom plate to the flexible top plate.

In some embodiments, the support body is a corrugated pipe, one end of the corrugated pipe is fixedly connected to the first connecting end, and the other end of the corrugated pipe is fixedly connected to the second connecting end.

The application further provides a flexible water pipe assembly, comprising a flexible water pipe, a flexible supporting and positioning mechanism and the flexible support described in any of the above technical solutions; the flexible supporting and positioning mechanism passes through the second mounting channel, and the flexible water pipe passes through the first mounting channel.

The application further provides a faucet device, comprising a faucet body, a faucet spout and the flexible water pipe assembly described in the above technical solutions; the faucet body is provided with a connector, the first connecting end of the flexible support is connected with the connector, and the second connecting end of the flexible support is connected with the faucet spout; one end of the flexible supporting and positioning mechanism is fixedly arranged in the connector, and the other end of the flexible supporting and positioning mechanism is fixedly arranged in the faucet spout; and one end of the flexible water pipe passes through the connector and is connected with a body water channel in the faucet body, and the other end of the flexible water pipe is connected with a faucet spout water channel of the faucet spout.

In some embodiments, a flexible sleeve is covered on an outer side of the flexible support.

In some embodiments, the flexible sleeve further encases the connector and the faucet spout; and a water outlet of the faucet spout is located on an outer side of the flexible sleeve.

Employing the foregoing technical solutions can implement the following beneficial effects.

According to the flexible support, the flexible water pipe assembly and the faucet device provided by the application, when the faucet spout is suffered a downward pressing force, the support body of the flexible support, the flexible supporting and positioning mechanism and the flexible water pipe can all be bent correspondingly, and the flexible support and the flexible water pipe can be kept in a bent state under the effect of the flexible supporting and positioning mechanism; when the faucet spout is suffered an upward pulling force, the support body, the internal flexible supporting and positioning mechanism and the flexible water pipe can be correspondingly straightened, and the flexible support and the flexible water pipe can be kept in an upright state under the action of the flexible supporting and positioning mechanism. Users can arbitrarily adjust a water outlet angle according to different requirements, which increases an angle adjusting range of the water outlet and is convenient to operate As shown in FIGS. 1 to 5, and in conjunction with FIGS. 6 to 8, an embodiment of the application provides a flexible support 100. The flexible support 100 is provided with a first mounting channel 4 for mounting a flexible water pipe 201 and a second mounting channel 5 for mounting a flexible supporting and positioning mechanism 202.

The flexible support 100 comprises a first connecting end 1, a second connecting end 2 and a support body 3 capable of being bent and deformed, and the support body 3 is connected between the first connecting end 1 and the second connecting end 2.

The second mounting channel 5 is located on one side of the first mounting channel 4, and the first mounting channel 4 and the second mounting channel 5 respectively penetrate through the first connecting end 1, the support body 3 and the second connecting end 2 in sequence.

The flexible support 100 provided by the application may be used in a faucet device, and plays a role in adjusting a water outlet angle of a water outlet. The flexibility mentioned in the application refers to bending or bending deformation of a component, not a structural strength of the component.

The flexible support 100 comprises the first connecting end 1, the second connecting end 2 and the support body 3, and the support body 3 is connected between the first connecting end 1 and the second connecting end 2. The first connecting end 1 is used for connecting with a faucet body 301 shown in FIGS. 9 to 13, and the second connecting end 2 is used for connecting with a faucet spout 302. The support body 3 can be bent and deformed to follow the bending of the flexible water pipe 201 and the flexible supporting and positioning mechanism 202. The flexible support 100 may be a metal support or a plastic support.

The flexible support 100 further comprises the first mounting channel 4 and the second mounting channel 5 which penetrate through the flexible support 100. The second mounting channel 5 is located on one side of the first mounting channel 4, and the first mounting channel 4 and the second mounting channel 5 respectively penetrate through the first connecting end 1, the support body 3 and the second connecting end 2 in sequence.

When in use, the flexible water pipe 201 passes through the first mounting channel 4, and the flexible supporting and positioning mechanism 202 passes through the second mounting channel 5. The flexible water pipe 201 is a flexible rubber hose. The flexible supporting and positioning mechanism 202 is a hinge mechanism, a spring mechanism, or the like, that can be bent and positioned.

When the faucet spout 302 is under a downward pressing force, the support body 3, the internal flexible supporting and positioning mechanism 202 and the flexible water pipe 201 can be bent accordingly. Under the action of the flexible supporting and positioning mechanism 202, the flexible support 100 and the flexible water pipe 201 can be kept in a bent state. When the faucet spout 302 is under an upward pulling force, the support body 3, the internal flexible supporting and positioning mechanism 202 and the flexible water pipe 201 can be straightened accordingly. Under the action of the flexible supporting and positioning mechanism 202, the flexible support 100 and the flexible water pipe 201 can be kept in an upright state. Users can arbitrarily adjust a water outlet angle according to different requirements, which increases an angle adjusting range of the water outlet and is convenient to operate.

When the flexible supporting and positioning mechanism 202 being the hinge mechanism or the spring mechanism or the like is bent, regular rounded corners may present at corners thereof, which will not affect the appearance of the product.

Figure 2:
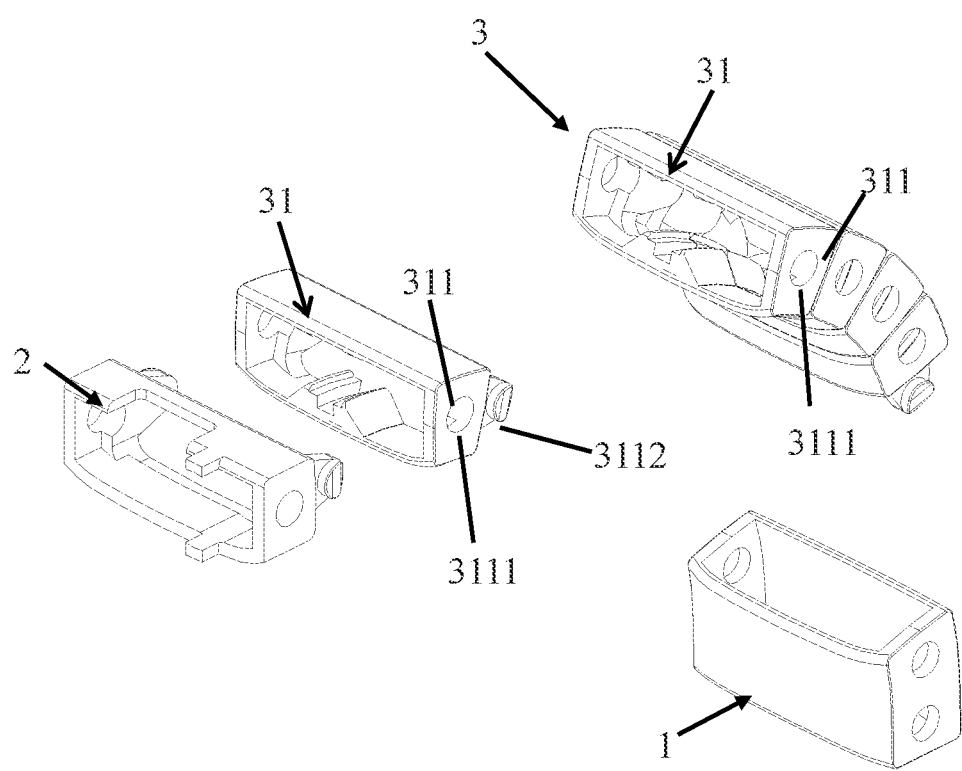
FIG. 2 is an exploded view of the flexible support shown in FIG. 1, according to an exemplary embodiment.

The support body 3 provided by the application has at least following three structures:

The support body 3 of the first structure, as shown in FIGS. 1 to 2, the support body 3 comprises a plurality of hollow shells 31 arranged in sequence, and any two adjacent hollow shells 31 are pivotally connected.

The two hollow shells 31 at two ends of the plurality of hollow shells 31 arranged in sequence are pivotally connected with the first connecting end 1 and the second connecting end 2 respectively.

The support body 3 provided by this embodiment is composed of a plurality of hollow shells 31, the hollow shells 31 are ring-shaped, and two adjacent hollow shells 31 may be pivotally connected and may swing mutually to adjust a relative position. Two adjacent hollow shells 31 may be connected by a hinge, a rotating shaft, or the like. The hollow shell 31 at one end of the plurality of hollow shells 31 is pivotally connected with the first connecting end 1, and may swing relative to the first connecting end 1 to adjust the angle; and the hollow shell 31 at one end of the plurality of hollow shells 31 is pivotally connected with the second connecting end 2, and may swing relative to the second connecting end 2 to adjust the angle.

When the flexible support 100 is suffered a force, the hollow shells 31 may rotate or swing accordingly, so as to automatically adjust the relative angle between the two hollow shells 31.

Preferably, as shown in FIGS. 1 to 2, a shell side plate 311 of the hollow shell 31 is provided with an assembling hole 3111 and a pivotal shaft 3112.

In two adjacent hollow shells 31, the pivotal shaft 3112 of one hollow shell 31 is assembled in the assembling hole 3111 of the other hollow shell 31, and the pivotal shaft 3112 is in clearance fit with the assembling hole 3111.

In this embodiment, two adjacent hollow shells 31 are connected by the pivotal shaft 3112. The shell side plate 311 of each hollow shell 31 is provided with the assembling hole 3111 and the pivotal shaft 3112. When connecting two adjacent hollow shells 31, the pivotal shaft 3112 of one hollow shell 31 is assembled in the assembling hole 3111 of the other hollow shell 31, where the pivotal shaft 3112 is in clearance fit with the assembling hole 3111, and the pivotal shaft 3112 can rotate in the assembling hole 3111.

The first connecting end 1 is provided with one assembling hole, and the pivotal shaft 3112 of the hollow shell 31 connected with the first connecting end 1 is assembled in the assembling hole of the first connecting end 1. The second connecting end 2 is provided with a pivotal shaft, and the pivotal shaft on the second connecting end 2 is assembled in the assembling hole 3111 of the hollow shell 31 connected with the second connecting end 2. Alternatively, the first connecting end 1 is provided with a pivotal shaft, and the pivotal shaft of the first connecting end 1 is assembled in the assembling hole 3111 of the hollow shell 31 connected with the first connecting end 1. The second connecting end 2 is provided with an assembling hole, and the pivotal shaft 3112 of the hollow shell 31 connected with the second connecting end 2 is assembled in the assembling hole of the second connecting end 2.

Figure 3:
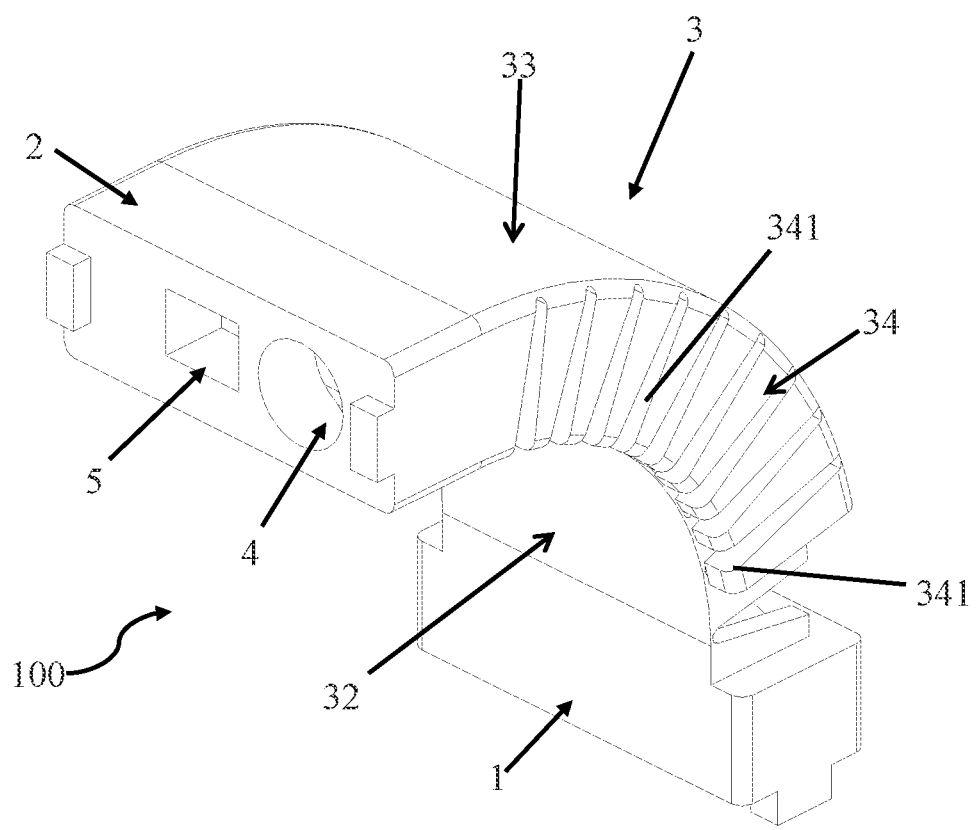
FIG. 3 is a stereoscopic diagram of a flexible support provided by a second embodiment of the application, according to an exemplary embodiment.
Figure 4:
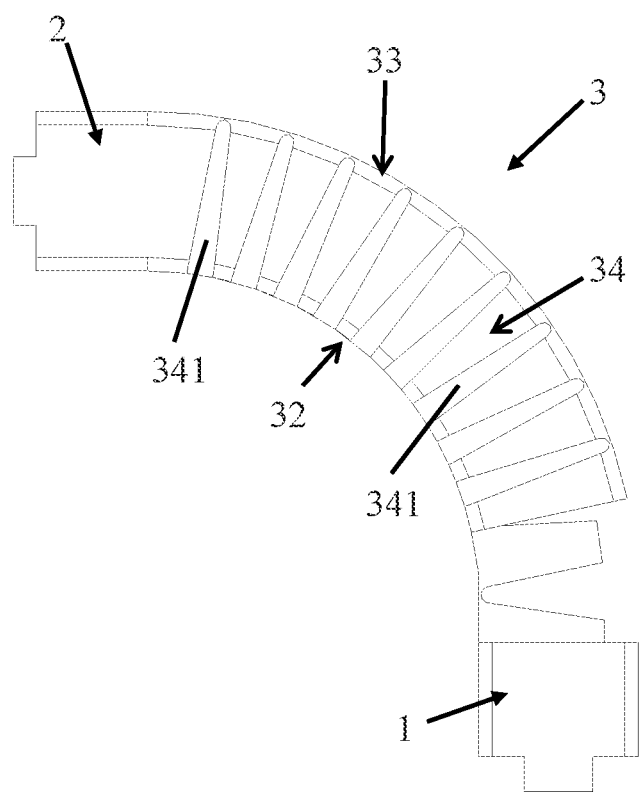
FIG. 4 is a side view of the flexible support shown in FIG. 3, according to an exemplary embodiment.

The support body 3 of the second structure: as shown in FIGS. 3 to 4, the support body 3 comprises a flexible bottom plate 32, a flexible top plate 33 and flexible side plates 34 connected to both sides of the flexible top plate 33.

The flexible bottom plate 32 is connected between the first connecting end 1 and the second connecting end 2.

One end of the flexible top plate 33 is connected with the second connecting end 2, and the other end of the flexible top plate 33 extends towards the first connecting end 1.

The flexible side plates 34 extend from the flexible top plate 33 to the flexible bottom plate 32.

The flexible side plate 34 is provided with a plurality of side plate notches 341 at intervals, and openings of the side plate notches 341 face the flexible bottom plate 32.

In this embodiment, the support body 3 is composed of the flexible bottom plate 32, the flexible top plate 33, and the flexible side plates 34. The flexible bottom plate 32 is connected between the first connecting end 1 and the second connecting end 2. One end of the flexible top plate 33 is connected to the second connecting end 2, the other end of the flexible top plate 33 extends toward the first connecting end 1, and the other end of the flexible top plate 33 is not connected with the first connecting end 1. The flexible side plates 34 are connected to the two sides of the flexible top plate 33 respectively. The flexible side plates 34 extend from flexible top plate 33 to the flexible bottom plate 32, and the flexible side plates 34 are not connected with the flexible bottom plate 32. Both the flexible bottom plate 32 and the flexible top plate 33 are bendable. Thicknesses of the flexible bottom plate 32 and the flexible top plate 33 may be set as desired. In order to realize the bending deformation of the flexible side plate 34, the flexible side plate 34 is provided with the plurality of side plate notches 341 at intervals, and openings of the side plate notches 341 face the flexible bottom plate 32. When the support body 3 is bent under force, a width of the side plate notch 341 becomes smaller, so that the flexible side plate 34 can make adaptive deformation to follow the flexible bottom plate 32 and the flexible top plate 33. After the two sides of one or more side plate notches 341 of the flexible side plate 34 are contacted, the flexible side plate 34 stops continuously deforming at the side plate notches 341.

Preferably, as shown in FIGS. 3 to 4, a width of the side plate notch 341 gradually decreases along a direction from the flexible bottom plate 32 to the flexible top plate 33, so that the side plate notch 341 is triangular as a whole, and has a narrow top and a wide bottom, so that the flexible side plate 34 can be bent while the connection stability with the flexible top plate 33 can be satisfied.

Figure 5:
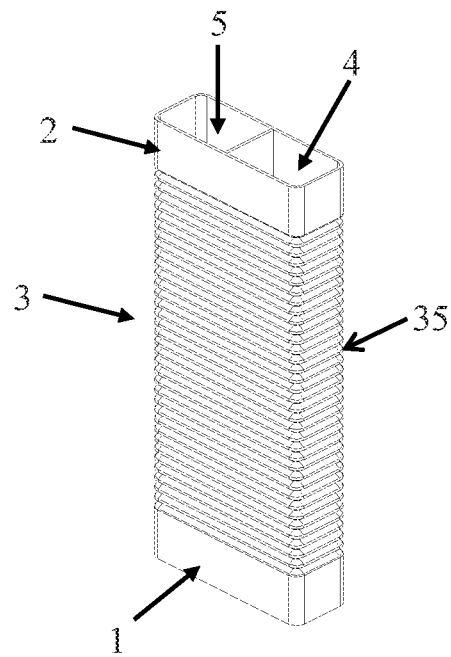
FIG. 5 is a stereoscopic diagram of a flexible support provided by a third embodiment of the application, according to an exemplary embodiment.

The support body 3 of the third structure: as shown in FIG. 5, the support body 3 is a corrugated pipe 35, one end of the corrugated pipe 35 is fixedly connected with the first connecting end 1, and the other end of the corrugated pipe 35 is fixedly connected with the second connecting end 2.

In this embodiment, the corrugated pipe 35 is adopted as the support body 3, which is simple in structure, and is convenient to operate.

Figure 6:
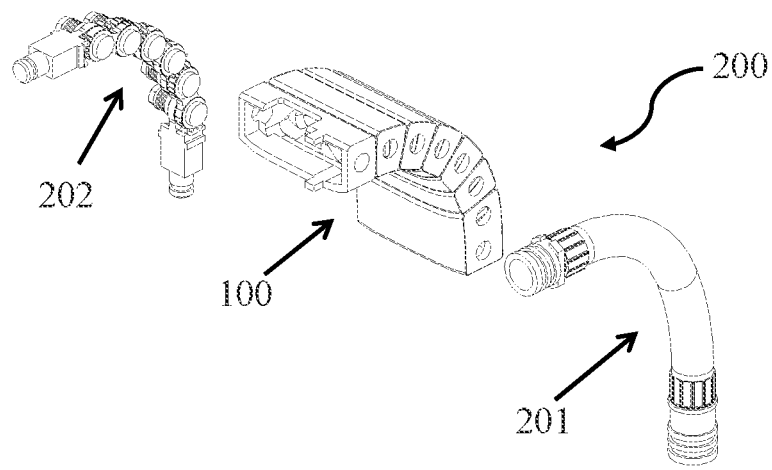
FIG. 6 is an exploded view of a flexible water pipe assembly provided by one embodiment of the application, wherein the flexible support in the first embodiment is adopted, according to an exemplary embodiment.
Figure 7:
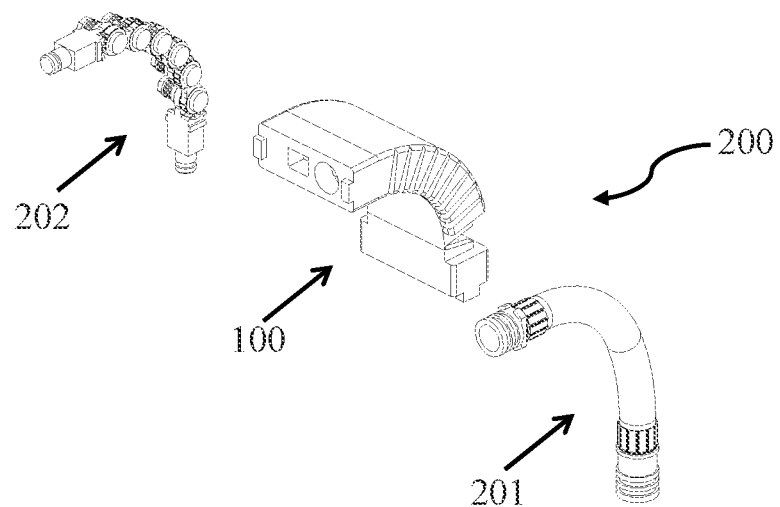
FIG. 7 is an exploded view of a flexible water pipe assembly provided by one embodiment of the application, wherein the flexible support in the second embodiment is adopted, according to an exemplary embodiment.
Figure 8:
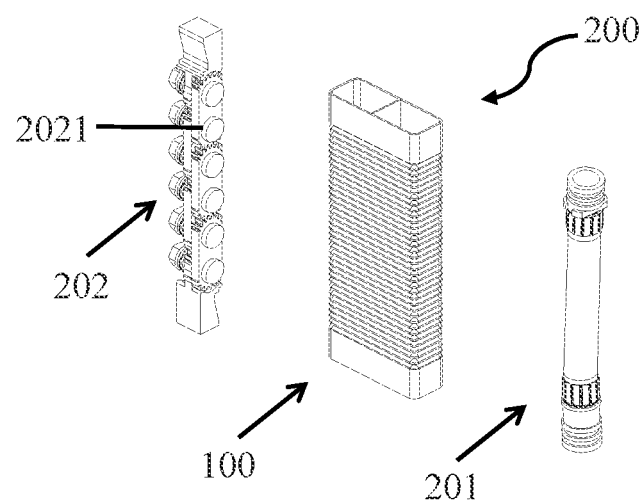
FIG. 8 is an exploded view of a flexible water pipe assembly provided by one embodiment of the application, wherein the flexible support in the third embodiment is adopted, according to an exemplary embodiment.

As shown in FIGS. 6 to 8, a flexible water pipe assembly 200 provided by an embodiment of the application comprises a flexible water pipe 201, a flexible supporting and positioning mechanism 202 and the flexible support 100 described in any of the foregoing embodiments.

The flexible supporting and positioning mechanism 202 passes through the second mounting channel 5, and the flexible water pipe 201 passes through the first mounting channel 4.

The flexible water pipe assembly 200 provided by the application comprises the flexible water pipe 201, the flexible supporting and positioning mechanism 202 and the flexible support 100.

For the structure, construction and working principle of the flexible support 100, please refer to the previous description of the flexible support 100, which will not be repeated here.

Rubber pipes may be selected as the flexible water pipe 20. The flexible water pipe 201 does not need to bear a positioning function again due to the flexible supporting and positioning mechanism 202 and the flexible support 100, and thus may be a hose.

The flexible supporting and positioning mechanism 202 may be a hinge mechanism, a spring mechanism, or the like. As shown in FIGS. 6 to 8 and FIG. 12, the hinge mechanism comprises a plurality of interlocking tooth plates engaged with each other in sequence, and can freely adjust an angle and maintain a bending position. The existing double-layer spring component, such as a spring component disclosed in Chinese utility model patent CN203533011U, may be employed as the spring mechanism, which can freely adjust the angle and can also be kept in a bent position. When the flexible supporting and positioning mechanism 202 being the hinge mechanism or the spring mechanism is bent, regular rounded corners may present at corners thereof, which will not affect the appearance of the product.

The flexible supporting and positioning mechanism 202 and the flexible support 100 are connected between the faucet body 301 and the faucet spout 302 shown in FIGS. 9 to 13.

When the faucet spout 302 is pressed down, the support body 3 and the flexible supporting and positioning mechanism 202 are bent and deformed under force, so that the flexible water pipe 201 is driven to be bent synchronously; a bent shape is limited by the flexible supporting and positioning mechanism 202, and the flexible support 100 and the flexible water pipe 201 are kept in a bent state by the flexible supporting and positioning mechanism 202.

When the faucet spout 302 is pulled upwardly, the support body 3 and the flexible supporting and positioning mechanism 202 to swing upward under force, so as to drive the flexible water pipe 201 to swing upward, and finally, the flexible support 100, the flexible water pipe 201 and the flexible supporting and positioning mechanism 202 are all kept in an upright state, and the flexible support 100 and the flexible water pipe 201 are kept in the upright state by the flexible supporting and positioning mechanism 202.

As shown in FIGS. 9 to 13, an embodiment of the application provides a faucet device 300, comprising the faucet body 301, the faucet spout 302 and the flexible water pipe assembly 200 according to the foregoing embodiment.

The faucet body 301 is provided with a connector 303, the first connecting end 1 of the flexible support 100 is connected with the connector 303, and the second connecting end 2 of the flexible support 100 is connected with the faucet spout 302.

One end of the flexible supporting and positioning mechanism 202 is fixedly arranged in the connector 303, and the other end of the flexible supporting and positioning mechanism is fixedly arranged in the faucet spout 302.

One end of the flexible water pipe 201 passes through the connector 303 and is connected with a body water channel in the faucet body 301, and the other end of the flexible water pipe is connected with a faucet spout water channel 3022 of the faucet spout 302.

The faucet device 300 provided by the application comprises the faucet body 301, the faucet spout 302 and the flexible water pipe assembly 200. The faucet body 301 is provided with the connector 303, and the faucet spout 302 is provided with a water outlet 3021. The first connecting end 1 of the flexible support 100 is connected with the connector 303, and the second connecting end 2 is connected with the faucet spout 302. One end of the flexible supporting and positioning mechanism 202 is fixedly connected with the connector 303, and the other end of the flexible supporting and positioning mechanism is fixedly connected with the faucet spout 302, by means of clamping or plugging. The flexible water pipe 201 communicates the body water channel in the faucet body 301 with the faucet spout water channel 3022 of the faucet spout 302.

Figure 9:
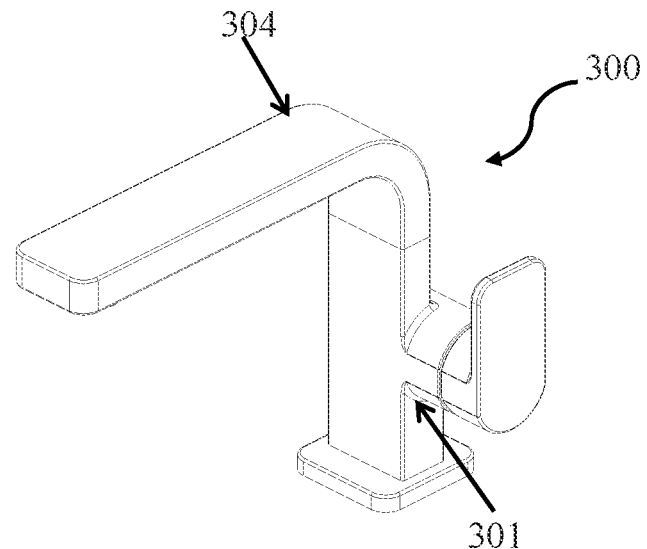
FIG. 9 is a stereoscopic diagram of a faucet device provided by one embodiment of the application, wherein the flexible water pipe assembly is in a bent state, according to an exemplary embodiment.
Figure 10:
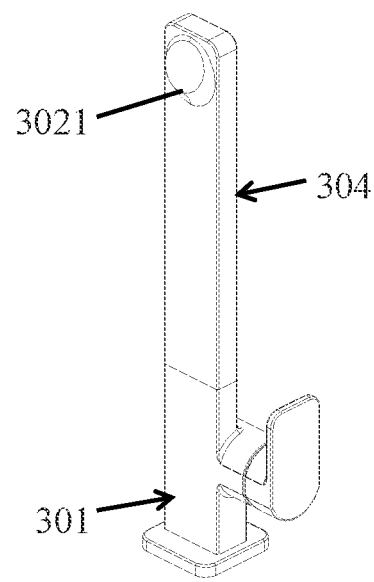
FIG. 10 is a stereoscopic diagram of a faucet device provided by one embodiment of the application, wherein the flexible water pipe assembly is in an upright state, according to an exemplary embodiment.

When it is desirable to adjust from the bent state shown in FIG. 9 to the upright state shown in FIG. 10, the faucet spout 302 is pulled upward to drive the support body 3 and the flexible supporting and positioning mechanism 202 to swing upward, and further drive the flexible water pipe 201 to swing upward, so that the flexible support 100, the flexible water pipe 201, and the flexible supporting and positioning mechanism 202 can all be kept in the upright state, and the flexible support 100 and the flexible water pipe 201 are kept in the upright state by the flexible supporting and positioning mechanism 202. In this case, the water outlet 3021 faces forward.

When it is desirable to adjust from the upright state shown in FIG. 10 to the bent state shown in FIG. 9, the faucet spout 302 is pressed downward to drive the support body 3 and the flexible supporting and positioning mechanism 202 to be bent and deformed downward, and further drive the flexible water pipe 201 to bend synchronously. A bent shape is limited by the flexible supporting and positioning mechanism 202, and the flexible support 100 and the flexible water pipe 201 are kept in the bent state by the flexible supporting and positioning mechanism 202. In this case, the water outlet 3021 faces downward.

Users can arbitrarily adjust a water outlet angle according to different requirements, which increases an angle adjusting range of the water outlet 3021 and is convenient to operate.

Figure 11:
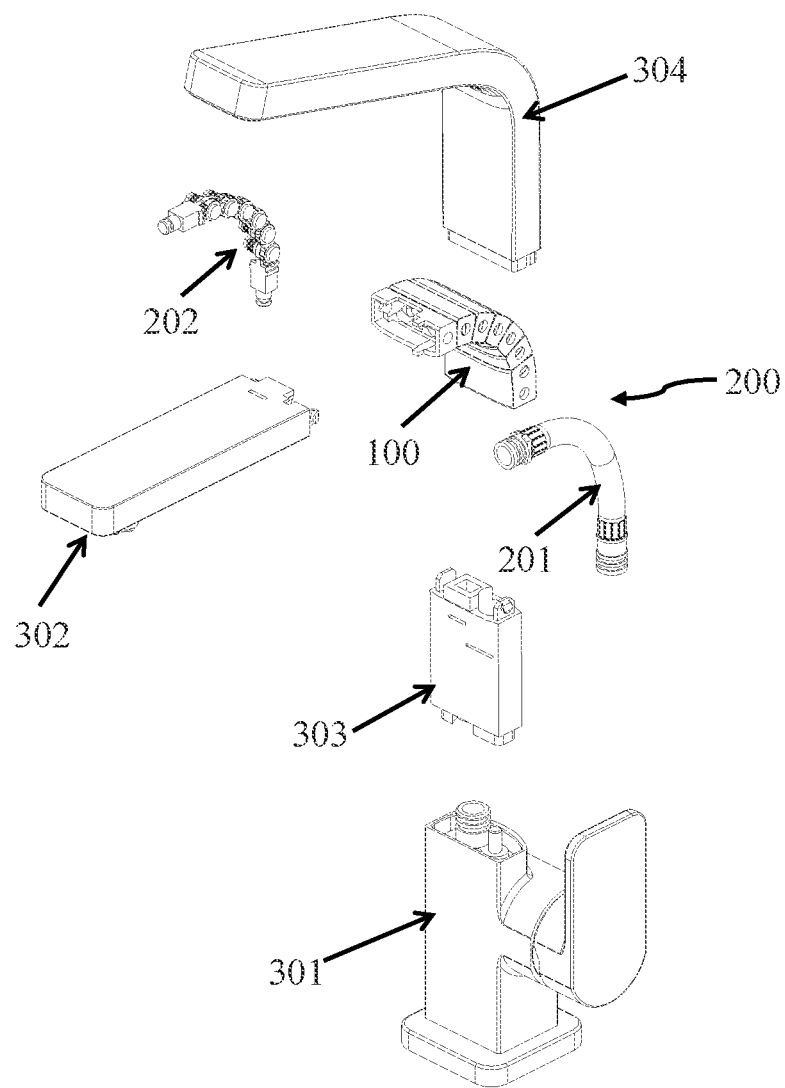
FIG. 11 is an exploded view of a faucet device provided by one embodiment of the application, according to an exemplary embodiment.
Figure 12:
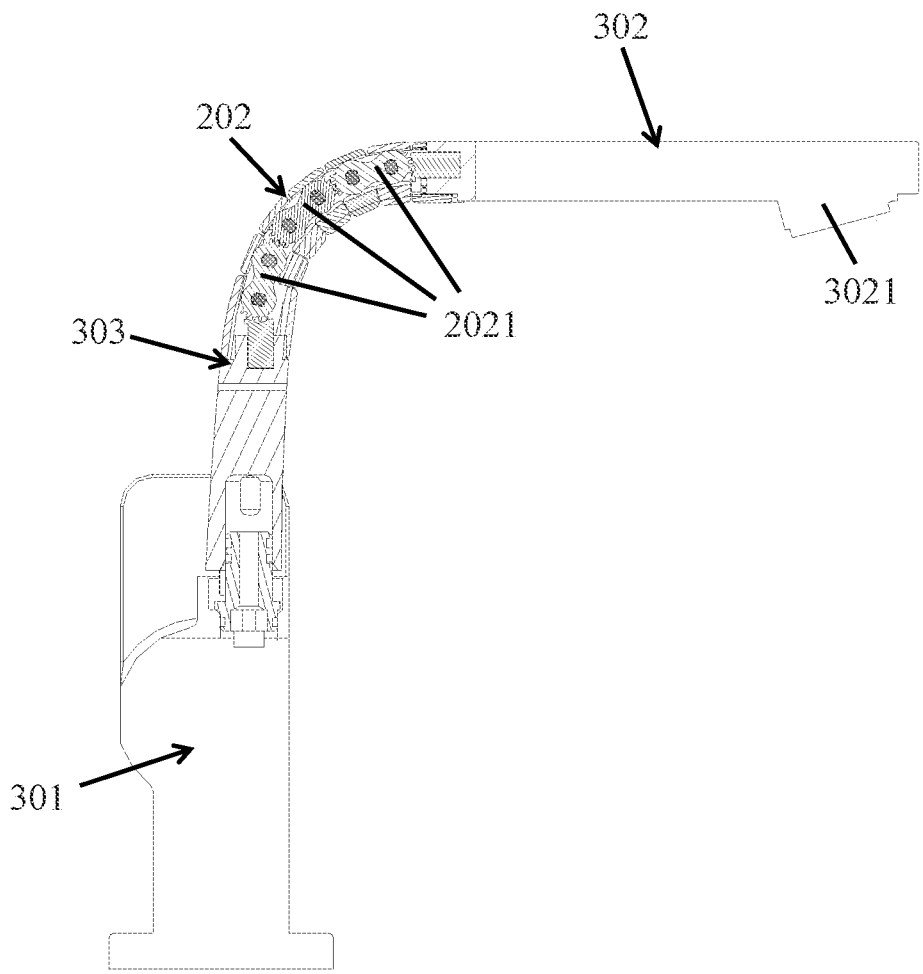
FIG. 12 is a sectional view of the faucet device shown in FIG. 9 along a flexible supporting and positioning mechanism, according to an exemplary embodiment.
Figure 13:
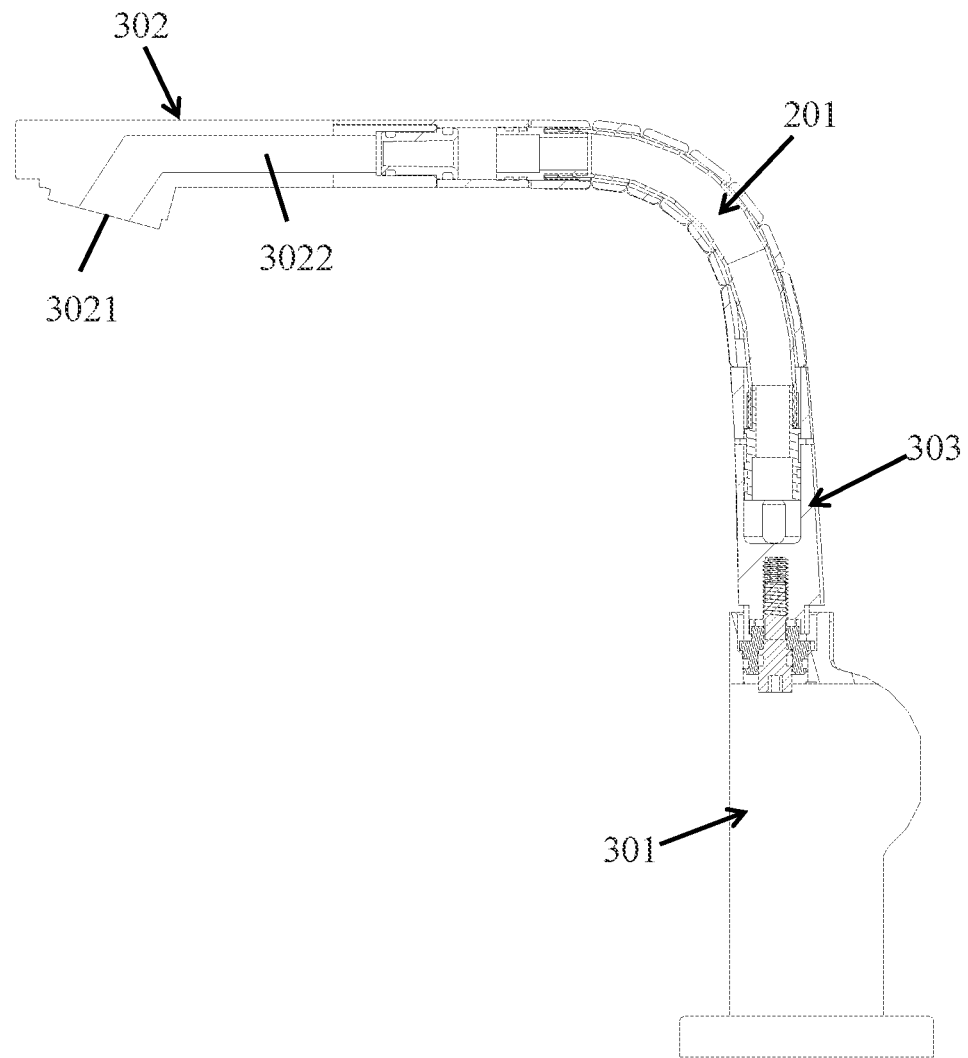
FIG. 13 is a sectional view of the faucet device shown in FIG. 9 along a flexible water pipe, according to an exemplary embodiment.

In one embodiment, as shown in FIGS. 9 to 11, a flexible sleeve 304 is covered on an outer side of the flexible support 100, which not only plays the role of protection, but also plays the role of shielding gaps and beautifying the appearance.

In one embodiment, as shown in FIGS. 9 to 11, the flexible sleeve 304 further encases the connector 303 and the faucet spout 302. The water outlet 3021 of the faucet spout 302 is located on the outside of the flexible sleeve 304, so that the faucet spout 302, the flexible support 100 and the connector 303 are all encased by the flexible sleeve 304, gaps among the faucet spout 302, the flexible support 100 and the connector 303 are shielded, the appearance of the product is relatively neat and uniform, and the grade of the product is improved.

The flexible sleeve 304 may be a rubber sleeve, which is soft in texture and good in touch feeling.

According to needs, the above technical solutions may be combined to achieve the best technical effect.

The above only describes the principles and the preferable embodiments of the application. It is to be pointed out that for those of ordinary skills in the art, several variations can be made on the basis of the principle of the application, which should also be regarded as the scope of protection of the application.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A flexible support, comprising
a first mounting channel for mounting a flexible water pipe;
a second mounting channel for mounting a flexible supporting and positioning mechanism;
a first connecting end;
a second connecting end; and
a support body capable of being bent and deformed, the support body coupled between the first connecting end and the second connecting end;
wherein the second mounting channel is located on one side of the first mounting channel, and wherein the first mounting channel and the second mounting channel respectively penetrate through the first connecting end, the support body and the second connecting end in sequence.

2. The flexible support according to claim 1, wherein the support body comprises a plurality of hollow shells arranged in sequence, and any two adjacent hollow shells are pivotally connected, and wherein two hollow shells at two ends of the plurality of hollow shells arranged in sequence are pivotally connected with the first connecting end and the second connecting end respectively.

3. The flexible support according to claim 2, wherein a shell side plate of the hollow shell is provided with an assembling hole and a pivotal shaft, and wherein, in the two adjacent hollow shells, the pivotal shaft of one hollow shell is assembled in the assembling hole of the other hollow shell, and the pivotal shaft is in clearance fit with the assembling hole.

4. The flexible support according to claim 1, wherein the support body comprises:
a flexible bottom plate connected between the first connecting end and the second connecting end;
a flexible top plate having one end connected with the second connecting end, and the other end of the flexible top plate extends towards the first connecting end; and
flexible side plates connected to both sides of the flexible top plate, the flexible side plates extending from the flexible top plate to the flexible bottom plate;
wherein the flexible side plate is provided with a plurality of side plate notches at intervals, and openings of the side plate notches face the flexible bottom plate.

5. The flexible support according to claim 4, wherein a width of the side plate notch decreases gradually in a direction from the flexible bottom plate to the flexible top plate.

6. The flexible support according to claim 1, wherein the support body is a corrugated pipe, one end of the corrugated pipe is fixedly connected to the first connecting end, and the other end of the corrugated pipe is fixedly connected to the second connecting end.

7. A flexible water pipe assembly, comprising:
a flexible water pipe;
a flexible supporting and positioning mechanism; and
a flexible support, the flexible support comprising:
a first mounting channel for mounting the flexible water pipe;
a second mounting channel for mounting the flexible supporting and positioning mechanism;
a first connecting end;
a second connecting end; and
a support body capable of being bent and deformed, the support body coupled between the first connecting end and the second connecting end;
wherein the second mounting channel is located on one side of the first mounting channel, wherein the first mounting channel and the second mounting channel respectively penetrate through the first connecting end, the support body and the second connecting end in sequence, and wherein the flexible supporting and positioning mechanism extends through the second mounting channel, and the flexible water pipe extends through the first mounting channel.

8. The flexible water pipe assembly according to claim 7, wherein the support body comprises a plurality of hollow shells arranged in sequence, and any two adjacent hollow shells are pivotally connected, and wherein two hollow shells at two ends of the plurality of hollow shells arranged in sequence are pivotally connected with the first connecting end and the second connecting end respectively.

9. The flexible water pipe assembly according to claim 8, wherein a shell side plate of the hollow shell is provided with an assembling hole and a pivotal shaft, and wherein, in the two adjacent hollow shells, the pivotal shaft of one hollow shell is assembled in the assembling hole of the other hollow shell, and the pivotal shaft is in clearance fit with the assembling hole.

10. The flexible water pipe assembly according to claim 7, wherein the support body comprises:
a flexible bottom plate connected between the first connecting end and the second connecting end;
a flexible top plate having one end connected with the second connecting end, and the other end of the flexible top plate extends towards the first connecting end; and
flexible side plates connected to both sides of the flexible top plate, the flexible side plates extending from the flexible top plate to the flexible bottom plate;
wherein the flexible side plate is provided with a plurality of side plate notches at intervals, and openings of the side plate notches face the flexible bottom plate.

11. The flexible water pipe assembly according to claim 10, wherein a width of the side plate notch decreases gradually in a direction from the flexible bottom plate to the flexible top plate.

12. The flexible water pipe assembly according to claim 7, wherein the support body is a corrugated pipe, one end of the corrugated pipe is fixedly connected to the first connecting end, and the other end of the corrugated pipe is fixedly connected to the second connecting end.

13. A faucet device, comprising:
a faucet body being provided with a connector;
a faucet spout; and
a flexible support, comprising:
a first mounting channel for mounting a flexible water pipe;
a second mounting channel for mounting a flexible supporting and positioning mechanism, one end of the flexible supporting and positioning mechanism being fixedly arranged in the connector, and another end of the flexible supporting and positioning mechanism being fixedly arranged in the faucet spout;
a first connecting end connected with the connector of the faucet body;
a second connecting end connected to the faucet spout; and
a support body capable of being bent and deformed, the support body coupled between the first connecting end and the second connecting end;
wherein the second mounting channel is located on one side of the first mounting channel, wherein the first mounting channel and the second mounting channel respectively penetrate through the first connecting end, the support body and the second connecting end in sequence, and wherein one end of the flexible water pipe passing through the connector and being connected with a body water channel in the faucet body, and the other end of the flexible water pipe being connected with a faucet spout water channel of the faucet spout.

14. The faucet device according to claim 13, wherein a flexible sleeve is covered on an outer side of the flexible support.

15. The faucet device according to claim 14, wherein the flexible sleeve further encases the connector and the faucet spout, and wherein a water outlet of the faucet spout is located on an outside of the flexible sleeve.

16. The faucet device according to claim 13, wherein the support body comprises a plurality of hollow shells arranged in sequence, and any two adjacent hollow shells are pivotally connected, and wherein two hollow shells at two ends of the plurality of hollow shells arranged in sequence are pivotally connected with the first connecting end and the second connecting end respectively.

17. The faucet device according to claim 16, wherein a shell side plate of the hollow shell is provided with an assembling hole and a pivotal shaft, and wherein, in the two adjacent hollow shells, the pivotal shaft of one hollow shell is assembled in the assembling hole of the other hollow shell, and the pivotal shaft is in clearance fit with the assembling hole.

18. The faucet device according to claim 13, wherein the support body comprises:
 a flexible bottom plate connected between the first connecting end and the second connecting end;
 a flexible top plate having one end connected with the second connecting end, and the other end of the flexible top plate extends towards the first connecting end; and
 flexible side plates connected to both sides of the flexible top plate, the flexible side plates extending from the flexible top plate to the flexible bottom plate;
 wherein the flexible side plate is provided with a plurality of side plate notches at intervals, and openings of the side plate notches face the flexible bottom plate.

19. The faucet device according to claim 18, wherein a width of the side plate notch decreases gradually in a direction from the flexible bottom plate to the flexible top plate.

20. The faucet device according to claim 13, wherein the support body is a corrugated pipe, one end of the corrugated pipe is fixedly connected to the first connecting end, and the other end of the corrugated pipe is fixedly connected to the second connecting end.

* * * * *